United States Patent Office

2,942,009
Patented June 21, 1960

2,942,009
METHOD OF REDUCING UNSATURATED COMPOUNDS WITH AN ALKALINE OR ALKALINE-EARTH METAL IN LIQUID AMMONIA

Pieter Westerhof, Weesp, Netherlands, assignor to North American Philips Company Inc., Irvington-on-Hudson, N.Y.

No Drawing. Filed Feb. 14, 1957, Ser. No. 640,067

Claims priority, application Netherlands Feb. 14, 1956

8 Claims. (Cl. 260—397.2)

It is known that different kinds of compounds can react with alkali metals under very different circumstances. Attention has been paid to the reaction between alkali metals and hydrocarbons, for example, to the reaction between lithium or sodium and benzene or naphthalene. These reactions were often carried out in the presence of specific solvents, for example dimethyl ether. In these cases it was important that the reaction components should not react with the solvent to form irreversible products. In the aforesaid reaction lithium or sodium additive products of benzene or naphthalene are obtained, which are capable of reacting with carbon dioxide to form carboxy compounds of benzene or naphthalene respectively.

The reaction between an aromatic hydrocarbon and an alkaline metal has been carried out in liquid ammonia. It was found that the reaction product can be decomposed and thus produce partially reduced aromatic compounds. It was found, for example, that sodium and benzene produced dihydrobenzene and sodium and naphthalene produced 1,4-dihydronaphthalene. The compound produced by the reaction between the alkali metals and the hydrocarbons was dissociated by means of a compound capable of producing hydrogen with sodium when dissolved in liquid ammonia and, without the use of a catalyst in the solution. The dissociation agent does not react with ammonia under these circumstances, while an ammonium salt is produced. Examples of such dissociation agents are alcohol, water, acid amides, for example formamide or urea also aromatic amines such as aniline and also alkyl mercaptans and aliphatic aldehydes.

The reduction by means of a solution of an alkaline metal in liquid ammonia has furthermore been carried out with unsaturated, aliphatic hydrocarbons. Thus butadiene yielded butene and isoprene yielded 2-methyl-2-butene. By the reduction of allo-ocimene:

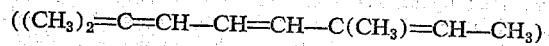

with sodium in liquid ammonia 2,6-dimethyl-3,5-octadiene was produced. From this experiment it was furthermore found that simple unsaturated hydrocarbons were not reduced by means of alkaline metals in liquid ammonia.

It is furthermore known that with the treatment of $\Delta^{8(9)}$-11-keto-steroids, particularly of $\Delta^{8(9)}$-22-isoallospirostene-3-$\beta$-ol-11-on and/or esters thereof with lithium or sodium in liquid ammonia in the presence of a lower aliphatic alcohol the double bond between the carbon atoms 8 and 9 is reduced and, moreover, that the ketooxygen-atom is reduced at the carbon atom 11.

In accordance with the invention it has now been found that the reduction by means of an alkali metal in liquid ammonia may also be employed to partially reduce compounds of the formula:

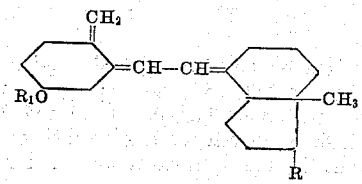

wherein $R_1$ designates a radical selected from the group consisting of hydrogen, aromatic acyl radicals, aliphatic acyl radicals and R designates a radical selected from the group consisting of saturated and unsaturated acyclic hydrocarbon radicals to thereby convert the methylene group ($=CH_2$) attached to the cyclo-hexane ring to a methyl group ($-CH_3$) while leaving the rest of the molecule unaltered.

It was already known that vitamin $D_2$, which compound belongs to the group of substances defined by the aforesaid general formula, can be reduced by means of an alkaline metal and a mono- or multivalent aliphatic alcohol to obtain dihydro-tachysterol$_2$. This known method has, however, the disadvantage that the yield of dihydrotachysterol$_2$ is comparatively small and also that with this method of production a comparatively large number of byproducts are obtained, so that the separation in the pure state of dihydrotachysterol$_2$ is rendered difficult.

With the present method according to the invention these disadvantages are reduced to a certain extent.

The invention relates to a method of reducing an unsaturated organic compound by means of an alkali metal or an alkaline-earth metal in liquid ammonia and is characterized in that a solution of a compound of the general formula:

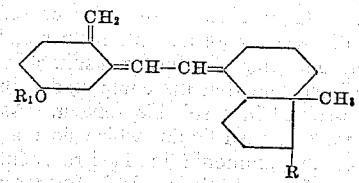

wherein $R_1$ designates a radical selected from the group consisting of hydrogen, aromatic acyl radicals, aliphatic acyl radicals and R designates a radical selected from the group consisting of saturated and unsaturated acyclic hydrocarbon radicals is caused to react with an alkali metal or alkaline-earth metal in liquid ammonia, the reaction product obtained being decomposed, the process being followed, if desired, by saponification to obtain a compound of the general formula:

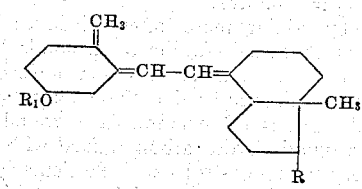

In accordance with the method of the invention both esters and alcohols may be used as starting material for the reduction. The esters which may be employed are for example those of acetic acid, propionic acid, butyric acid, benzoic acid or ortho-nitrobenzoic acid. However, if desired, other esters than those mentioned above may be used, for example esters of unsaturated aliphatic carboxylic acids such as acrylic acid or crotonic acid.

The side chain R may have, within the limitations referred to above, different structures. The side chain R may be a saturated or unsaturated acyclic hydrocarbon radical such as

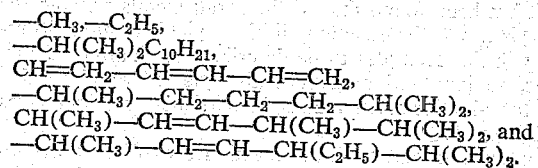

The process claimed is particularly useful when R designates one of the last three radicals of this group in which case the compounds reduced are cholesterol, ergosterol or stigmasterol and their esters respectively. If the side chain has one or more double bonds, one or more of these double bonds may be reduced during the reduction. However, this reaction need not impede the reduction of the exocyclic methylene group, if only care is taken that the reaction should be carried out with an adequate quantity of an alkali metal or alkaline-earth metal.

The asymmetrical structure of the molecule of the starting material and of that of the reduced compounds permits various stereoisomer configurations. There are four stereoisomer compounds which differ in the stereochemical configurations of the groups bound to the system of two conjugated double bonds lying between the two nuclei. Moreover, the carbon atoms to which the groups $OR_1$, R or $CH_3$ are bound are responsible for the possibility of still further stereochemical isomers. It should furthermore be noted that the stereochemical configuration neither of the starting substances, nor of the compounds produced by the method of the invention is fully established.

In accordance with the invention it was not found that a particular stereochemical configuration of the starting substances is more active during the course of the reduction reaction. It has, however, been found that both from trans-vitamin $D_2$ and from the corresponding cis-isomer, when using the method of the invention, the same isomer was obtained. A similar phenomenon has been found with trans- and cis-vitamin $D_3$.

It has been found also that no reduction of the starting substances takes place if they are caused to react with an alkali metal or an alkaline-earth metal in liquid ammonia without being dissolved in a suitable solvent. It is therefore important that the compound to be reduced should be dissolved in a suitable solvent. As such solvents there may be used liquids which do not react with the metal or the ammonia in an irreversible manner under the reaction conditions. It is furthermore desirable that the solution of the compound to be reduced should remain liquid under the reaction circumstances. Suitable solvents are, for example, many mono-ethers, such as dimethyl-, diethyl-, methylethyl- or methylbutyl-ether. Use may furthermore be made of aliphatic hydrocarbons, for example n-hexane, or n-heptane; also alicyclic or aromatic hydrocarbons may be used, but usually not alone, since many of these liquids are solid under the reaction circumstances.

However, by mixing these latter solvents with other solvents in which these alicyclic or aromatic hydrocarbons are satisfactorily soluble, a resultant lowering of the melting point is achieved so that these solvents also can be employed. It has for example been found that the alicyclic or aromatic hydrocarbons mixed with aliphatic ethers are very suitable as solvents. Particularly suitable are found to be mixtures of cyclohexane with diethylether, of cyclohexane with dimethylether and benzene or toluene with dimethyl- or diethylether.

All the solvents cannot be mixed homogeneously at the reaction temperature with a solution of an alkaline- or alkaline-earth metal in liquid ammonia. For example, when cooled, a homogeneous mixture of 75 mls. of liquid ammonia and 85 mls. of diethylether separates out at a temperature of about −40° C. It should be noted here that the reaction between the metal and the compound to be reduced in liquid ammonia is best performed in a homogeneous system.

It has been found that of the alkali metals suitable for carrying out the reaction, lithium yielded the best results in the examples to be described hereinafter. However, sodium and potassium also yielded good results. Of the alkaline-earth metals in particular calcium gives good results.

In order to carry out the reaction according to the invention a solution of the compound to be reduced may be added to a solution of an alkali metal or an alkaline-earth metal in ammonia, but substantially equal results are obtained by adding the latter solution to a solution of the compound to be reduced. As an alternative, a mixture of a solution of the compound to be reduced and liquid ammonia may be produced, the required quantity of the alkali metal or alkaline-earth metal being added thereto. It is important in all cases that the metal should be quite pure and should not be contaminated for example by oxides or nitrides. Care will therefore be taken that during the reaction between the alkali metal or alkaline-earth metal and the compound to be reduced no water should enter into the reaction mixture and to prevent other oxides from being formed. In many cases, therefore, nitrogen or hydrogen will be passed over the reaction mixture or, if desired, ammonia gas. However, if the reduction is carried out with the aid of lithium, it is not advisable to use nitrogen, since lithium readily produces nitrides. It is important that in all stages of the reaction the formation of hydrogen in statu nascendi should be avoided. This form of hydrogen is capable of reacting with the compound to be reduced or with the reduced compound in a manner such that other double bonds than those of the exocyclic methylene group are reduced. It should, however, be noted that normal hydrogen gas does not affect the reduction.

The formation of hydrogen in statu nascendi may be avoided by employing such quantities of alkaline or alkaline-earth metal and of the compound to be reduced to one another that at the beginning of the decomposition of the reaction product none or only a very small excess quantity of metal is contained in the solution. If the reaction solution has still a faint blue colour or if this colour has just vanished, the ratio between the quantities of metal and of the compound to be reduced may be considered as suitable.

The decomposition of a solution containing no or substantially no excess of metal may be carried out with the aid of compounds which, under the reaction circumstances, replace a metal atom in the reaction product by a hydrogen atom.

Compounds suitable for this purpose are, for example, ammonium salts of strong acids, for example ammonium chloride, ammonium bromide, ammonium sulphate and ammonium nitrate, furthermore water or aliphatic alcohols, such as methanol, ethanol, propanol, butanol or tertiary amyl alcohol.

It is furthermore also possible to carry out the reaction between the alkali metal or alkaline-earth metal and the compound to be reduced with an excess quantity of metal. In this case it is, however, desirable that the excess quantity of metal should be decomposed without the formation of hydrogen in statu nascendi. This may be performed by an agent capable of oxidizing the metal. For this purpose use may be made of the sodium-, calcium-, or ammonium nitrates, -bromates or -iodates. After the oxidation of the metal the reduction may be completed by adding the aforesaid compounds which are suitable for decomposing the reaction product formed. Oxidizing agents which oxidize the metal, and also oxidize the organic compound should not be used.

By measuring the ultraviolet absorption spectrum of the reaction mixture it can be determined in many cases whether the reduced compound is formed and approximately to what extent. Many compounds of the formula:

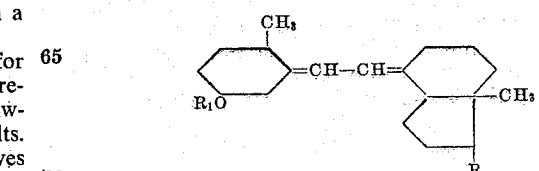

are characterized by an ultraviolet absorption spectrum having maxima at 242, 251 and 261 m$\mu$. The associated E-values are about 34,500, 40,000 and 25,800 respectively. If the groups $R_1$ or R have their own absorption spectrums in the ultraviolet region for example if $R_1$ designates a benzoate or a nitrobenzoate group and/or R designates a conjugated system of double bonds, the spectrum of these compounds may exhibit other maxima than those mentioned above.

From the crude reaction mixtures the reduced compounds may be separated by methods corresponding in principle with those known for the separation of dihydrotachysterol$_2$ from the reaction mixture of ergocalciferol or tachysterol$_2$ and an alkaline metal and an aliphatic monovalent or multivalent alcohol.

The known reduction mixture, may for example, be purified from unwanted byproducts and contaminations by chromatographic methods. As an alternative, an ester of a lower aliphatic fatty acid may be made of the reduced compound, this ester being isolated and purified readily by crystallization. According to a third method the unwanted byproducts produced during the reduction reaction are converted into a readily crystallizable ester, for example, the dinitro-benzoic acid ester or the allophanic acid ester, the crystals being separated out and the residue being worked up to obtain the desired compounds. It has finally also been suggested to combine one or more of these methods. It has been suggested to isolate dihydrotachysterol$_2$ by converting the reaction mixture into an ester of a lower aliphatic fatty acid and by separating out chromatographically in some way or other the impurities, i.e. before or after the esterification or after saponification.

These methods of purifying may also be used to separate out a compound of the formula:

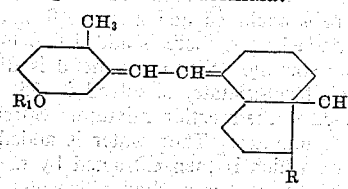

from a reduction mixture obtained in accordance with the invention.

The invention is particularly suitable for the production of dihydrotachysterol$_2$ and of dihydrotachysterol$_3$ (dihydrotachysterol$_3$ is a compound corresponding to dihydrotachysterol$_2$, but the side chain of which is identical with that of cholesterol). The invention allows the production of said dihydro-tachysterols with a markedly larger yield than obtainable by the methods hitherto known. The yield of dihydrotachysterol$_2$ for example, if the process starts from tachysterol$_2$ by one of the best known methods, is about 25% and if this compound is produced by the reduction of ergocalciferol it is about 15 to 20%. In accordance with the method of the invention, however, yields of the non-purified product of 40 to 50% are obtainable. A further advantage is that during the reduction according to the invention fewer coloured products are obtained than by the reduction in accordance with known methods. Moreover, the separation of the pure product is simplified by a higher yield in the desired ratio in the crude reduction mixture. It should finally be noted that both with the reduction of trans-ergocalciferol and of cis-ergocalciferol the same dihydrotachysterol$_2$ is obtained and also with the reduction of trans-cholecalciferol and of cis-cholecalciferol dihydro-tachysterol$_3$ of the same stereochemical configuration is obtained. By means of the extinction values associated with the maxima of the ultraviolet absorption spectrum of the reduced, non-purified products an impression may be obtained about the yield of the reduction reaction.

*Example I*

In a three-neck bulb, provided with an agitator and a dropping funnel, a mixture of 75 mls. of liquid ammonia and of 50 mls. of absolute ether has added to it small bits of lithium while stirring and cooling at a temperature of −60° C., with the exclusion of moisture, while a feeble flow of gaseous ammonia is passed over, until the solution of the metal becomes faintly blue. Then 130 mgs. of lithium is added, the mixture is stirred until the metal is dissolved. To the dark blue solution is added 1 g. of ergocalciferol in 35 mls. of absolute diethylether by way of the dropping funnel. The mixture is stirred further for 15 minutes and then the reaction product is decomposed by adding 1 g. of ammonium chloride. Then the reaction mixture has carefully added to it water, the aqueous liquid being extracted with ether. The ether solution is washed with water and a sodium chloride solution and distilled after drying. The residue is a colourless resin which exhibits the typical U.V. absorption spectrum of dihydrotachysterol$_2$ with maxima at 242, 251 and 260 m$\mu$;

$$E_{1\,cm.}^{1\%}$$

at 251 m$\mu$ is 236, which corresponds to a content of about 23% of dihydrotachysterol$_2$.

*Example II*

1 g. of ergocalciferol-acetate is dissolved in a mixture of 75 mls. of liquid ammonia and 50 mls. of absolute diethylether, which is rendered free from water by adding a few pieces of lithium; this is evident from a permanent slight blue colour. To the mixture, which is contained in a three-neck bulb with an agitator and a cooled dropping funnel, there is added dropwise, while under cooling at −60° C., and while stirring and passing over a feeble flow of dry gaseous ammonia and while moisture is excluded a 0.4 n solution of lithium in liquid ammonia until the blue colour just remained. The mixture is decomposed by means of ammonium chloride and worked up in the manner described in Example I. The amorphous substance obtained is hydrolysed in a mixture of diethylether and an excess of methanolic potassium lye by boiling. After the addition of water the ether extract is separated out, washed with water and after drying, it is distilled. The amorphous residue exhibits the typical absorption spectrum of dihydrotachysterol$_2$ with a value of $$E_{1\,cm.}^{1\%}$$

at 251 m$\mu$ of 306.

*Example III*

In the same manner as described in Example I 1 g. of ergocalciferol propionate is reduced by means of 115 mgs. of lithium. After the termination of the reaction the reaction product is decomposed by means of 1 g. of ammonium chloride. The reaction mixture is then worked up in the manner described in Example II. The amorphous residue exhibits the typical absorption spectrum of dihydrotachysterol$_2$ and a value $$E_{1\,cm.}^{1\%}\ (251\ m\mu)\ of\ 217$$

*Example IV*

In the manner described in Example III 1 g. of ergocalciferol-benzoate is reduced by means of 1 g. of lithium and the mixture is worked up and hydrolysed. The amorphous substance obtained exhibits the typical U.V. absorption spectrum of dihydrotachysterol$_2$ and a value $$E_{1\,cm.}^{1\%}\ (251\ m\mu)\ of\ 224$$

*Example V*

In the manner described in Example II 1 g. of cholecalciferol-butyrate is reduced by means of 140 mgs. of lithium and the mixture is worked up and hydrolysed. The amorphous substance obtained exhibits the absorption spectrum of dihydrotachysterol$_3$ and a value $$E_{1\,cm.}^{1\%}$$

at 251 m$\mu$ of 199.

Example VI

In the apparatus described in Example II a mixture of 75 mls. of liquid ammonia and 50 mls. of absolute diethylether is rendered just free from water by adding a small quantity of lithium, which is evident from the light blue colour which is just maintained. A solution of 1 g. of ergocalciferol-o-nitrobenzoate in 35 mls. of absolute diethylether and then a solution of 200 mgs. of lithium in 125 mls. of liquid ammonia are added while stirring, while passing over a feeble flow of dry ammonia gas and cooling to an extent such that the mixture continues boiling (temperature of the mixture is $-28°$ C.). The solution takes on a bright red colour; by adding bits of lithium a permanent blue colour is obtained. The excess of lithium is removed by adding 2 gs. of sodium nitrate, after which the reaction product is decomposed by adding 2 gs. of ammonium chloride. The substance is worked up and hydrolysed as described in Example II, after which an amorphous product is obtained, which exhibits the typical U.V. absorption curve of dihydrotachysterol$_2$;

$$E_{1\,cm.}^{1\%} (251\ m\mu)\ \text{is}\ 273$$

Example VII

To a mixture of 75 mls. of liquid ammonia and 50 mls. of absolute diethylether contained in a three-neck bulb with a dropping funnel and an agitator there are added, while moisture is excluded and a feeble flow of gaseous ammonia is passed over and the mixture is cooled to 60° C., small bits of calcium until a permanent blue colour is obtained. Then 1.6 g. of calcium is added, which dissolves in 15 minutes when stirred. Then a solution of 1 g. of ergocalciferol in 35 mls. of absolute diethylether is added in drops. The colour of the mixture is greenish brown. After stirring for five minutes the reaction mixture is decomposed by adding 0.5 g. of ammonium chloride. To the black solution obtained, water is then carefully added, the colour thus disappearing and calcium hydroxide being precipitated. After working up the amorphous product in the conventional manner its U.V. absorption spectrum is determined. This exhibits a peak at $$251\ m\mu\ (E_{1\,cm.}^{1\%}\ 126)$$

and weak maxima at 242 and 260 m$\mu$. A qualitative paper-chromatographic examination proved the presence of a comparatively large quantity of dihydrotachysterol$_2$.

Example VIII

In an apparatus and under circumstances as described in Example I 345 mgs. of sodium is dissolved in 75 mls. of liquid ammonia of $-65°$ C. To this solution is added a solution of 2 gs. of ergocalciferol in 35 mls. of absolute diethylether, after which the mixture is stirred for 10 minutes. After decomposition by means of ammonium chloride and working up in the conventional manner an amorphous product is obtained which has a value $$E_{1\,cm.}^{1\%} (251\ m\mu)$$

of 113 and absorption maxima at 242, 251 and 260 m$\mu$.

Example IX

To a boiling mixture of 75 mls. of liquid ammonia and 50 mls. of absolute diethylether (boiling temperature $-28°$ C.) contained in a three-neck bulb with an agitator and a cooled dropping funnel, there is added in drops, while stirring, a diluted solution of lithium in liquid ammonia until the colour is just blue. Thereto is added a solution of 1 g. of ergocalciferol-acetate, after which a 0.6 n lithium solution in liquid ammonia is added in drops, while stirring, until the blue colour is just maintained. The small surplus of lithium is decomposed by adding 0.5 g. of sodium nitrate, after which the reaction mixture is decomposed by means of 0.5 g. of ammonium chloride and then worked up and hydrolysed. The amorphous residue exhibits the characteristic U.V. absorption spectrum of dihydrotachysterol$_2$, $$E_{1\,cm.}^{1\%} (251\ m\mu) = 427$$

Example X

In the manner described in Example IX, but using n-hexane as a solvent, a product with $$E_{1\,cm.}^{1\%} (251\ m\mu) = 523$$

is obtained.

Example XI

A mixture of 75 mls. of liquid ammonia and 50 mls. of absolute diethylether is rendered free from water by adding a few bits of lithium until the solution obtained remains just blue. Then, while stirring and excluding moisture a further 65 mgs. of lithium is dissolved in the mixture. 1 g. of ergocalciferol acetate is then dissolved in 35 mls. of absolute thiophene-free benzene and added to the solution and in the reaction mixture thus discoloured such a quantity of lithium is dissolved that the liquid is just blue. The decomposition by means of 1 g. ammonium chloride is followed by working up and alkaline hydrolysis. The U.V. absorption spectrum which is characteristic of dihydrotachysterol$_2$, of the product obtained has a value $$E_{1\,cm.}^{1\%} = 360$$

Example XII

To 75 mls. of liquid ammonia and 50 mls. of n-hexane, while moisture is excluded and a feeble flow of gaseous ammonia is passed over, there is added 600 mgs. of potassium, while stirring. When the metal is dissolved, 3 gs. of ergocalciferol-acetate, dissolved in 35 mls. of n-hexane is added to the reaction mixture. Stirring is continued for five minutes. Then water is added carefully to the mixture, which is then extracted by means of diethylether. The extract is washed with water, dried and distilled. The amorphous residue exhibits the characteristic absorption spectrum of dihydrotachysterol$_2$ $$E_{1\,cm.}^{1\%} (251\ m\mu) = 157$$

Example XIII

To a mixture of 75 mls. of liquid ammonia and 50 mls. of anhydrous diethylether are added small bits of lithium while moisture is excluded, then the mixture is stirred and a feeble flow of gaseous ammonia is passed over, until the solution maintains a blue colour. Finally 130 mgs. of lithium was added to the solution; after 15 minutes the lithium was dissolved. To this solution was added 1 g. trans-ergocalciferol, dissolved in 35 mls. of anhydrous diethylether. After 5 minutes this reaction mixture was decomposed by means of 1 g. of ammonium chloride. To the mixture is added water and the ether extract is washed with water, dried and subjected to distillation. The amorpheous residue exhibits the absorption spectrum characteristic of dihydrotachysterol$_2$ and a value of $$E_{1\,cm.}^{1\%} (251\ m\mu) = 220$$

Example XIV 1.9 gs. of the reduction product of ergocalciferolacetate obtained in the manner described in Example XI is dissolved in petroleum ether and filtered through a column of 25 gs. of alumina standardized in accordance with the method of Brockmann. The column is washed subsequently with petroleum ether, after which the first 500 mls. of solution is distilled. The residue (0.73 g.) is dissolved in 5 mls. of absolute pyridine and to this solution is added 1.5 mls. of acetic acid anhydride. After the solution has been kept at room temperature for one night, the mixture is poured out in a saturated sodium bicarbonate solution and the mixture is extracted by means of diethylether. The etheric solution is washed in succession with water, diluted hydrochloric acid, water and bicarbonate solution, dried and distilled. The residue is recrystallized from 35 mls. of methanol. 0.44 g. of dihydrotachysterol₂-acetate is obtained; melting point 107 to 109° C.

*Example XV*

By further elution of the column described in Example XIV with 500 mls. of absolute ether, a product is obtained, which consists of about 40% dihydrotachysterol₂-acetate. 1 g. thereof is dissolved in 10 mls. of benzene and 5 mls. of pyridine, after which 1 g. of 3.5-dihydrobenzoylchloride, dissolved in 10 mls. of benzene, is added. After 30 minutes of shaking, the mixture is decomposed by means of water and the benzenic solution is washed in succession with diluted hydrochloric acid, diluted bicarbonate solution and water and finally dried and distilled. The dinitrobenzoate mixture crystallizes from acetone and methanol; after filtering and recrystallizing from ether methanol 0.54 g. of 3.5 dinitrobenzoate of dihydro-ergocalciferol-I is obtained; melting point 94 to 95° C. After alkaline hydrolysis the filtrate yields a substantially colourless, oily substance having a content of dihydrotachysterol₂ of about 60%.

*Example XVI*

In a mixture of 225 mls. of liquid ammonia and 150 mls. of n-hexane there is dissolved, while stirring and passing over a feeble flow of gaseous ammonia, 450 mls. of lithium. The mixture is cooled so that it boils. To this solution is added a solution of 7 gs. of chloecalciferol-butyrate in 105 mls. of n-hexane; after 5 minutes of stirring the solution is still blue. The mixture was decomposed by adding 1 g. of sodium nitrate, then diluted with water and extracted by means of diethylether. The ether solution is washed with a solution of kitchen salt, then dried, filtered and distilled. The residue is hydrolysed by boiling it for 20 minutes with 100 mls. of diethylether and 100 mls. of methanol, in which 3.5 gs. of potassium hydroxide is dissolved. After the addition of water and drying of the ether solution thus washed with water the solution is distilled; the residue weighs 5.8 gs. and has a value $$E_{1cm}^{1\%} (251\ m\mu)\ of\ 253$$

This product is dissolved in 125 mls. of petroleum ether (40 to 50° C.), the solution is filtered through a column of 75 gs. of alumina, standardized in accordance with Brockmann. The column is washed subsequently with petroleum ether. The first 500 mols of eluate contain 1.7 gs. of the product having a value $$E_{1cm}^{1\%} (251\ m\mu)\ of\ 603$$

This product is dissolved in 35 mls. of absolute benzene and 25 mls. of absolute pryridine. To the solution is added a soution of 1.7 gs. of p-phenylazobenzylchloride in 25 mls. of benzene. The reaction mixture is heated for four hours at 40 to 50° C., while moisture is excluded. After decomposition by means of water, the mixture is diluted with ether and the solution is then washed in succession with a diluted bicarbonate solution, water, diluted hydrochloric acid, water, a bicarbonate solution and water. The solution thus obtained is dried and distilled in vacuo. The residue is dissolved in absolute benzene and filtered through a column of 4 gs. of neutralized alumina. The benzene of the filtrate is distilled off in vacuo. The residue is crystallized from acetone methanol (5:4). After recrystallisation from acetone 0.72 g. of pale orange needles were obtained (melting point 107 to 109° C.). 150 gs. of the p-phenylazobenzoic acid ester of dihydrotachysterol₃ thus obtained is dissolved in 300 mls. of diethylether. The solution is mixed with a solution of 7.2 gs. of potassium hydroxide in 60 mls. of methanol. This mixture is refluxed for 30 minutes. The cooled mixture is diluted with water and extracted with ether. The etheric solution is washed with water, dried and distilled in vacuo.

The residue crystallized from methanol. The colourless needles of dihydrotachysterol₃ obtained after recrystallisation from methanol and a small supply of water, have a melting point of 101 to 102.5° C. The U.V. absorption spectrum has three absorption maxima with the extinction values:

$$E_{1cm}^{1\%} = (242.5\ m\mu)\ 872$$
$$E_{1cm}^{1\%} = (251\ m\mu)\ 1012$$
$$E_{1cm}^{1\%} = (260.5\ m\mu)\ 653$$

The dihydrotachysterol₃ has double the increasing effect on the calcium percentage of blood of rats as compared with dihydrotachysterol₂.

What is claimed is:

1. A method of reducing an unsaturated compound corresponding to the general formula:

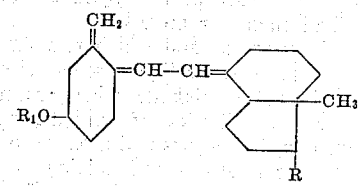

wherein $R_1$ designates a radical selected from the group consisting of hydrogen, aromatic acyl radicals and aliphatic hydrocarbon acyl radicals, and R represents a member of the group consisting of saturated and olifenically unsaturated aliphatic hydrocarbon radicals containing from 1 to 13 carbon atoms comprising the steps, dissolving said unsaturated compound in an organic liquid which does not react with a liquid ammonia solution of an alkali metal or an alkaline earth metal to form irreversible products, and which remains liquid in such a solution, said organic liquid being selected from the group consisting of aliphatic ethers, saturated aliphatic hydrocarbons, mixtures of aliphatic ethers and saturated alicyclic hydrocarbons and mixtures of aliphatic ethers and aromatic hydrocarbons, mixing the resultant solution with a liquid ammonia solution of a metal selected from the group consisting of alkali metals and alkaline earth metals to form thereby a reaction product between said metal and said unsaturated compound, and decomposing said reaction product with a compound capable of replacing a metal atom with a hydrogen atom, said compound being selected from the group consisting of ammonium salts of strong inorganic acids, water and lower aliphatic alcohols to form thereby a product corresponding to the general formula:

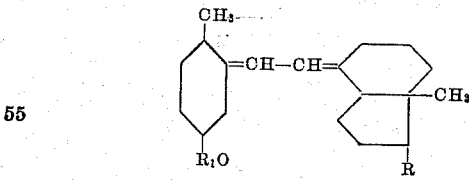

wherein R and $R_1$ each have their previously designated meanings.

2. The method of claim 1 in which a substantially stoichiometrical amount of the metal is employed.

3. The method of claim 1 in which the reaction product is decomposed with a lower aliphatic alcohol.

4. The method of claim 1 in which the reaction product is decomposed with an ammonium salt of a strong inorganic acid.

5. The method of claim 1 in which a surplus of the metal is used and after the reaction has terminated said surplus of metal being oxidized by means of an oxidizing agent which is incapable of producing atomic hydrogen when oxidizing said metal.

6. The method of claim 5 in which oxidizing agent is selected from the group consisting of sodium, potassium and ammonium nitrates, iodates and bromates.

7. A method of reducing an unsaturated compound corresponding to the general formula:

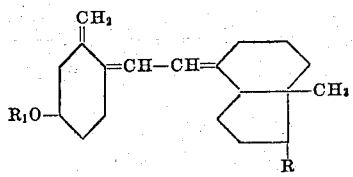

wherein $R_1$ designates a radical selected from the group consisting of hydrogen, aromatic acyl radicals and aliphatic hydrocarbon acyl radicals, and R represents a member of the group consisting of saturated and olifenically unsaturated aliphatic hydrocarbon radicals containing from 1 to 13 carbon atoms comprising the steps, dissolving said unsaturated compound in an organic liquid which does not react with a liquid ammonia solution of an alkali metal or an alkaline earth metal to form irreversible products, and which remains liquid in such a solution, said organic liquid being selected from the group consisting of aliphatic ethers, saturated aliphatic hydrocarbons, mixtures of aliphatic ethers and saturated alicyclic hydrocarbons and mixtures of aliphatic ethers and aromatic hydrocarbons, mixing the resultant solution with a liquid ammonia solution of calcium to form thereby a reaction product between said calcium and said unsaturated compound and decomposing said reaction product with a compound capable of replacing a metal atom with a hydrogen atom, said compound being selected from the group consisting of ammonium salts of strong inorganic acids, water and lower aliphatic alcohols to form thereby a product corresponding to the general formula:

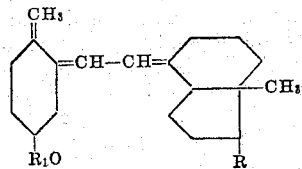

wherein R and $R_1$ each have their previously designated meanings.

8. A method of reducing an unsaturated compound corresponding to the general formula:

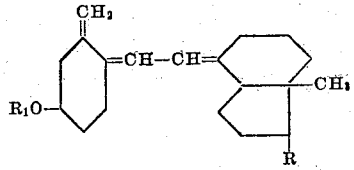

wherein $R_1$ designates a radical selected from the group consisting of hydrogen, aromatic acyl radicals and aliphatic hydrocarbon acyl radicals, and R represents a member of the group consisting of saturated and olifenically unsaturated aliphatic hydrocarbon radicals containing from 1 to 13 carbon atoms comprising the steps, dissolving said unsaturated compound in an organic liquid which does not react with a liquid ammonia solution of an alkali metal or an alkaline earth metal to form irreversible products, and which remains liquid in such a solution, said organic liquid being selected from the group consisting of aliphatic ethers, saturated aliphatic hydrocarbons, mixtures of aliphatic ethers and saturated alicyclic hydrocarbons and mixtures of aliphatic ethers and aromatic hydrocarbons, mixing the resultant solution with a liquid ammonia solution of an alkali metal to form thereby a reaction product between said metal and said saturated compound, and decomposing said reaction product with a compound capable of replacing a metal atom with a hydrogen atom, said compound being selected from the group consisting of ammonium salts of strong inorganic acids, water and lower aliphatic alcohols to form thereby a product corresponding to the general formula:

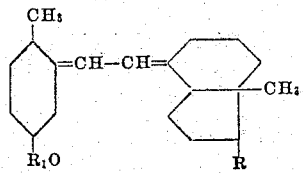

wherein R and $R_1$ each have their previously designated meanings.

References Cited in the file of this patent

UNITED STATES PATENTS

| | | |
|---|---|---|
| 2,070,117 | Dalmer et al. | Feb. 9, 1937 |
| 2,228,491 | Werder | Jan. 14, 1941 |
| 2,693,475 | Velluz et al. | Nov. 2, 1954 |
| 2,707,710 | Velluz et al. | May 3, 1955 |
| 2,798,082 | Chemerda et al. | July 2, 1957 |
| 2,840,575 | Koevoet et al. | June 24, 1958 |
| 2,843,609 | Colton | July 15, 1958 |